ABCDEFGHI
JJKLMNOPQ
RSTUVWXYZ
&1234567890$¢£
ÆŒ abcdefghijklm
nopqrstuvwxyz
1234567890.,;:-!?'()—
☞ æœ fi ff fl ffi ffl ½ ¼

Fig. 1.

ABCDEFGHI
JJKLMNOPQ
RSTUVWXYZ
&1234567890$¢£
ÆŒ aabcdefgghijklm
nopqrstuvwxyyz
1234567890.,;:'!?()
æææœfi ff fl ffi ffl ½ ¾ %

Fig. 2.

July 12, 1932.　　A. A. DIETZ　　1,866,629
ALPHABET TYPE
Filed March 13, 1929　　3 Sheets-Sheet 3

ABCDEFGHIJKL
MNOPPQRRRST
UVWXYZ&ÆŒ£
1234567890$-'...!?

August A. Dietz INVENTOR.

BY Philip S. Hopkins
ATTORNEY

Patented July 12, 1932

1,866,629

UNITED STATES PATENT OFFICE

AUGUST A. DIETZ, OF RICHMOND, VIRGINIA

ALPHABET TYPE

Application filed March 13, 1929. Serial No. 346,630.

My invention relates to alphabet type and has for its primary object a scientifically designed form for alphabet type which reduces materially the eye-strain incident to viewing type now in common use, and provides a rendition of the Roman alphabet, with all the numerals and characters incident thereto, which does not disturb, destroy or re-form the basic form of the various letters, numerals and characters, but which by adherence to the principles underlying my new alphabet, makes printed matter easier to perceive and read.

In order that my invention may be clearly understood, a brief comment on the underlying scientific principle upon which the invention is based, and on the history of the development of type-printing, will be necessary. Various objects and advantages of my invention will be apparent as this comment and description proceeds.

The physical act of ocular perception involves an instantaneous moving of the sight along the contour of an object. Thus we distinguish an oval from a circle and a triangle from a rectangle. This is readily demonstrated. If there is suddenly presented before the eye an oval and a circle, the eye will distinguish the difference in form immediately. This is because it is naturally simple and easy for the eye to follow the gracefully curved outline of these figures and to perceive without effort the difference in curvature. If a hexagon and a septagon be now suddenly presented before the eye, the eye will hesitate, pause, blink, travel along the lines, unconsciously stopping at each angle to count, until it has traveled the entire contour. Therefore, obviously greater effort on the part of the eye is necessary to distinguish between these two forms, due solely to the fact that straight lines and angles are involved, instead of curves only.

Another simple demonstration of this theory is furnished by lightning. It is a fact that the eye almost invariably closes instantaneously at the sight of "zig-zag" lightning, while it is able to "see out" the entire duration of vertical or horizontal "snake-curve" lightning. It is not fear directing the muscles of the eye-lid in the shutting-out of "zig-zag" lightning. It is because sight cannot follow the angles at the speed of the apparition. Snake-curve lightning, however, exerts no strain on the eye for sight keeps pace with curves at any speed.

We must, therefore, conclude that the ocular perception of curves requires less effort and involves less eye-strain than it does of straight lines and angles. Straight lines and angles tire the sight, whereas curves are restful.

The human eye is a ball-like device controlled by muscles. We can "roll" our eyes without appreciable effort or strain in following the outline of circles and curves, but strain at once sets in when we attempt to follow the outlines of angular and pointed objects.

Analyzing a little further the physical phase of ocular perception, we find that the eye in viewing an area of parallel lines of varying thicknesses, either horizontal or vertical, experiences a sensation of fatigue and often results in visionary distortion of the lines and in optical illusions. On the other hand, perception of lines or other objects having an evenly and proportionately distributed mass of color, is restful. The logical conclusion, therefore, is that a rapid succession of light and shadow, represented by alternating fine and bold lines, on a printed page for instance, annoys and strains the vision, whereas, a uniformity in the distributed mass of color on the printed page is restful.

From the foregoing, is deduced the theory upon which the principles of my invention are based, namely, that curves are more restful to the eye than straight lines and angles, and that an even and proportionately distributed mass of color is likewise more restful than alternating lights and shadows of varying widths. The principle then upon which this invention is based, and as applied to the Roman alphabet with all its letters, numbers and characters, is in short that a balanced mass of color, combined with the elimination of straight lines, sharp angles, and pointed projections, if applied to printed matter will reduce to a minimum the eye-strain experienced in reading. To attain this result has been the effort and aim of scientists and letter-designers for many years.

The complete elimination of straight lines and angles and the balancing of the color-mass has never before been embodied in a design for the Roman alphabet. The Roman alphabet may be said to be the result of evolution. Its origin is generally attributed to the Phœnicians, and the characters of their written language were twenty-two in number. The forms of the Phœnician letters and characters were angular. Each represented a phonetic sound of their speech. The Greeks later adopted and adapted these angular designs of the Phœnicians to the phonetic sounds of their speech, virtually retaining all the angular forms. The Romans, in turn, adopted and adapted the forms of the Greek alphabet, but gave to it certain "curves of grace" as we find in the nine capital letters B—C—D—G—O—P—Q—R and S. Except for the addition of the capital letters J and U, we have used this Roman alphabet without change in form for some 3,000 years.

The phenomenal spread of printing in the Roman alphabet, and the increased speed at which one reads today has forced upon the attention of science the fact of an increased eye-strain. Applicant presents in this invention the remedy for this condition. Applicant's alphabet type, forming the subject of this application, eliminates those features of the present Roman alphabet, which, as shown in the foregoing discussion forms the cause of eye-strain in reading. Every design of the Roman alphabet in use today is constructed of straight lines, curves, rectangles and all other degrees of angles, and square, pointed or round serifs. Furthermore, all Roman alphabets in use today and particularly the types employed for printing of newspapers, magazines, and books, have the design so formed as to present alternating thick and thin stems and curves.

Applicant has completed what the Romans perhaps set out to do some 3,000 years ago by adding "lines of grace" and providing an even and proportional distribution of the color-mass to every character of the alphabet. Applicant, as before stated, neither disturbs, distorts or re-forms the basic forms of the characters, and therefore, his new alphabet type is not a "style," "fad," or "freak" alphabet, appealing to a passing fancy as do many new forms of alphabets designed from time to time. Applicant's invention has a truly scientific basis for its inception.

As illustrative of my invention, I have shown in the accompanying drawings, forming a part of this application, certain forms of alphabet type embodying my invention. The following brief detailed description will be clear upon reference to these drawings wherein like reference numerals indicate like parts.

In the drawings:—

Figure 1 shows an alphabet of roman capitals and small or lower case letters, together with numbers and commonly used characters and signs.

Figure 2 illustrates an alphabet of italics, both capital and small or lower case letters, together with figures, characters and signs, to match the roman.

Figures 3, 4:
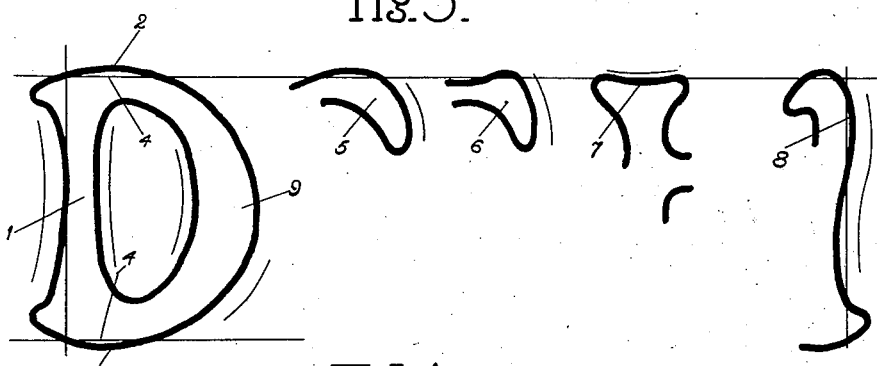
Figure 3 shows an alphabet of heading or title letters and numbers embodying my invention.
Figure 4 is a detailed illustration, illustrating the principle upon which my invention is applied to various letters of the alphabet.

Referring now particularly to Figure 4, the principle of curved lines and balanced color-mass underlying my invention will be clear from the letters and parts of letters illustrated. It may be observed in the letter D shown in this figure that the lines forming the outline of such letters as B—D—P—R— etc. are all curved. The vertical stem 1 curves throughout its length to the flares at the upper and lower ends thereof. The top 2 and bottom 3 of the lines forming such letters as B—D—P and R are shown to have a decided curve by comparison with the straight lines 4.

This figure also shows at 5 the formation of the top of such letters as C, G, and S in accordance with my invention, namely, all curved lines. At 6 is illustrated the curvature of the lines outlining the top of such letters as E—F and T. The reference character 7 shows the curvature of the top of stems provided with serifs found in such letters as I and H.

The curve of the lines outlining such lower case or small letters as "l," "c," "d," "q" and "b" is indicated clearly in Figure 4 at 8.

Reference to the other figures of the drawing will clearly show the use of the proportionately distributed and balanced mass of color, embodied in this invention. The proportion of color-mass of the various parts of the letters and characters providing the most restful appearance to the eye may be expressed as 100% for all down strokes and from 75% to 80% in thickness for all up strokes and cross bars. This is purely a comparative weight or thickness of strokes upon which the letters are formed, and such proportion tends to give an even and balanced mass of color restful to the eye.

Illustrative of this feature of the invention, attention is directed to Figure 1 of the drawings where this distribution of color mass is clearly apparent in all the characters. Note particularly the upstroke and cross bar of the capital "A" as being about 75% of the mass of the downstroke. Note also this feature in capital letters "H," "U," and "W".

On such letters as B—D—P and R, having lobes 9 (see Figure 4), the weight of the swell or stroke should drop slightly below center. This is also clear from the other figures of the drawings.

The alphabet type herein described does not depend alone for its value on its relief of eye-strain, although such may be said to be the principal object and purpose thereof. Nevertheless, the alphabet has other practical advantages particularly when used for newspapers, magazines and bookprinting. In these classes of printing, the elimination of angles, sharp corners and straight lines will prevent the characters "filling in" with ink, as is common at present because of the low grade of printing inks and paper used and speed of the presses on these classes of printing. Furthermore, the evenly distributed strain on the lines of the letters and characters will insure considerably greater resistance to wear.

The letters and characters of this alphabet type may be used in such comparative sizes as to best suit them for matrices, on typesetting and casting machines, such as are commonly used today and readily lend themselves to both the roman and the mating italic letters and are therefore readily adaptable for two-letter molds or matrices.

Obviously the adaptation of my invention to the multiplicity of variations in forms and design of alphabet type gives to it a wide range of usefulness, and I do not wish to be limited to the specific forms and designs shown in this application. The designs herein shown are illustrative only and are intended to serve merely as an indication of the wide usefulness of my invention, limited only by the appended claims.

I claim:

1. A font of alphabet type characters each characterized by entirely curved regular lines.

2. A font of alphabet type characters each characterized by all curved regular lines and the absence of sharp angles.

3. A font of alphabet type characters each characterized by a distributed color-mass in the proportion of 100% for down strokes and 75% to 80% for up strokes and cross bars in thickness.

4. A font of alphabet type characters each characterized by a distributed color-mass in the proportion of 100% for down strokes and 75% to 80% for up strokes and cross bars in thickness, and by all curved lines.

In testimony whereof, I affix my signature.

AUGUST A. DIETZ.